United States Patent [19]
Umeda

[11] 3,735,683
[45] May 29, 1973

[54] MOTOR DRIVEN PHOTOGRAPHIC CAMERA

[75] Inventor: Kaoru Umeda, Japan

[73] Assignee: Minolta Camera Kabushiki Kaisha, Minami-ku, Osaka-shi, Osaka-fu, Japan

[22] Filed: Sept. 8, 1972

[21] Appl. No.: 288,122

[52] U.S. Cl..................95/31 EL, 242/71.6, 352/124
[51] Int. Cl..........................G03b 1/12, G03b 19/04
[58] Field of Search.....................95/31 EL; 352/124; 242/71.6

[56] References Cited
UNITED STATES PATENTS
3,598,033   8/1971   Sasaki...............................95/31 EL Primary Examiner—Robert P. Greiner
Attorney—Watson, Cole, Grindle & Watson

[57] ABSTRACT

A motor driven photographic camera having a motor for driving a film winding/shutter charging mechanism, wherein there is provided a manually operative shaft for selectively disconnecting the motor from the film winding/shutter charging mechanism for transmitting the rotational movement of the motor to a film rewinding gear. There is also provided a film rewinding shaft which is connected to the film rewinding gear through a stop lever and which is rotatable in coaxial relationship with the film rewinding gear. The film rewinding shaft has a clutch for transmitting the rotational movement thereof to a shaft to film magazine. The rotation of the film rewinding shaft is stopped temporarily for displacing the shaft axially with respect to the film rewinding gear for connecting the clutch of the film rewinding shaft to the film rewinding spool of the magazine. After and while maintaining the engagement between the clutch and the film rewinding spool shaft, the film rewinding shaft is released from its locked position and allowed to rotate for rewinding the film.

6 Claims, 6 Drawing Figures

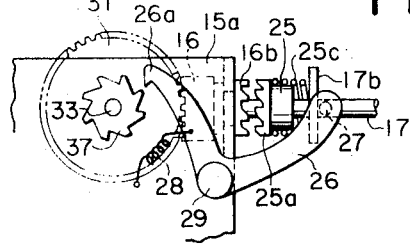
FIG. 3
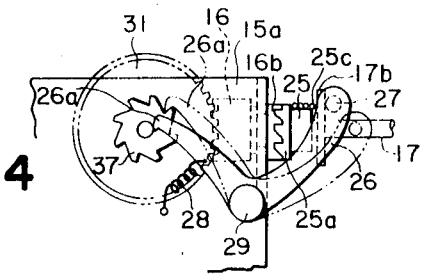
FIG. 4
FIG. 5
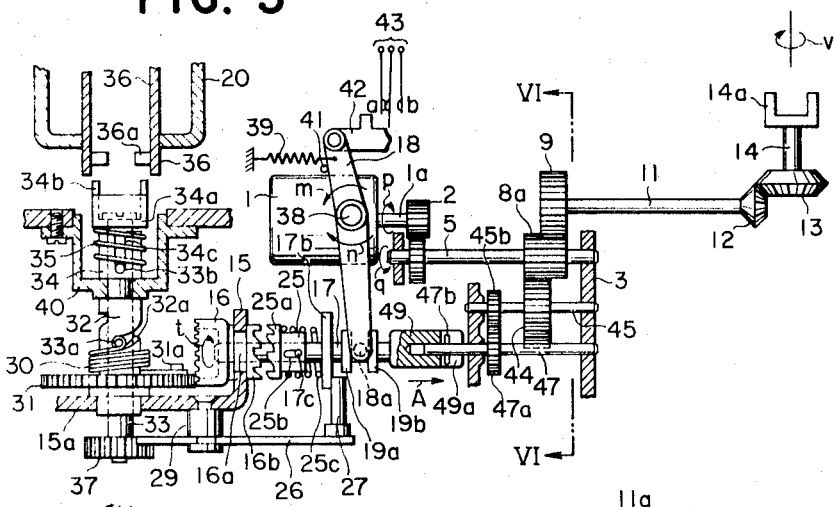
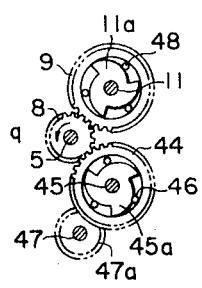
FIG. 6

3,735,683

MOTOR DRIVEN PHOTOGRAPHIC CAMERA

BACKGROUND OF THE INVENTION

FIELD OF THE INVENTION

This invention relates generally to a motor driven photographic camera, and more particularly to a film rewinding mechanism for a motor driven photographic camera.

In the motor driven photographic cameras, there have thus far been made various attempts to effect the rewinding of the film with the aid of the driving force of the motor employed for film winding and shutter charging of the camera.

More particularly, the motor is connected to a rewinding shaft by way of a clutch member and at the same time the rewinding shaft is connected to the roll shaft of the film cassette or magazine by spreading apart a pair of claws provided at the fore end of the rewinding shaft so as to bring the claws into contact with the inner surfaces of the magazine shaft for friction-driving the magazine shaft in a film-rewinding direction. However, with this arrangement, a slip occurs between the claws and the inner surface of the magazine shaft and it is difficult to transmit the driving power of the motor efficiently to the magazine shaft.

According to the present invention, in order to eliminate the above noted difficulties, the driving force of the motor is transmitted to the film rewinding mechanism by means of an operating shaft and the rewinding shaft is shifted axially to bring the film magazine shaft and the rewinding shaft into complete engagement with each other, thus transmitting the driving force of the motor efficiently to the magazine shaft through the rewinding shaft for rewinding the film.

THE OBJECTS OF THE INVENTION

An object of the present invention is to provide a film rewinding mechanism for motor driven photographic cameras, which is simple in construction and reliable in operation.

Another object of the present invention is to provide a film rewinding mechanism for motor driven photographic cameras, wherein the film rewinding shaft is securely engageable with the film winding shaft of the film magazine or film cassette without slips between the shaft of the magazine and the film rewinding shaft.

Still another object of the present invention is to provide a film rewinding mechanism for motor driven photographic cameras, wherein, when rewinding the film, a clutch of the rewinding shaft which has been held in a retracted stand-by position with respect to a locking member provided on the shaft of the film magazine is shifted axially for engagement with a locking member of the magazine shaft by switching an operating shaft into a film rewinding position, thus transmitting the driving force of the motor to the film rewinding mechanism.

These together with other objects and features of the present invention will become apparent from the following description showing preferred embodiments of the invention.

SUMMARY OF THE INVENTION

The present invention is directed to a film rewinding mechanism for motor driven photographic cameras, including an operating shaft movable by manual operation from a film-winding/shutter-charging position to a film rewinding position for transmitting the driving force of the motor to a film rewinding gear shaft through the operating shaft, a stop member mounted on the film rewinding gear shaft and adapted to stop the rotational movement of a film rewinding shaft which is engaged with the film rewinding gear shaft with aid of a spring, the stop member displacing the film rewinding shaft in an axial direction with respect to the gear shaft, thereby bringing a clutch formed on the film rewinding shaft into engagement with a shaft of the film rewinding magazine and releasing the film rewinding shaft from locked engagement with the stop member while maintaining the engagement with the film rewinding gear shaft for transmitting the driving force of the motor for rotating the film rewinding magazine shaft for rewinding the film thereon.

BRIEF DESCRIPTION OF THE DRAWINGS

FIG. 3 is a bottom view showing a stop member of a film rewinding shaft of the mechanism shown in FIGS. 1 and 2 in the film winding position;

FIG. 4 is a view similar to FIG. 3, wherein the stop member as stopping the rotation of the film rewinding shaft is shown in phantom while the stop member as preventing the axial displacement of the rewinding shaft is shown in solid line;

FIG. 5 is a partially sectioned side view showing another embodiment of the present invention; and FIG. 6 is a cross-sectional view taken along line VI—VI of FIG. 5.

DETAILED DESCRIPTION OF THE INVENTION

Figure 1:
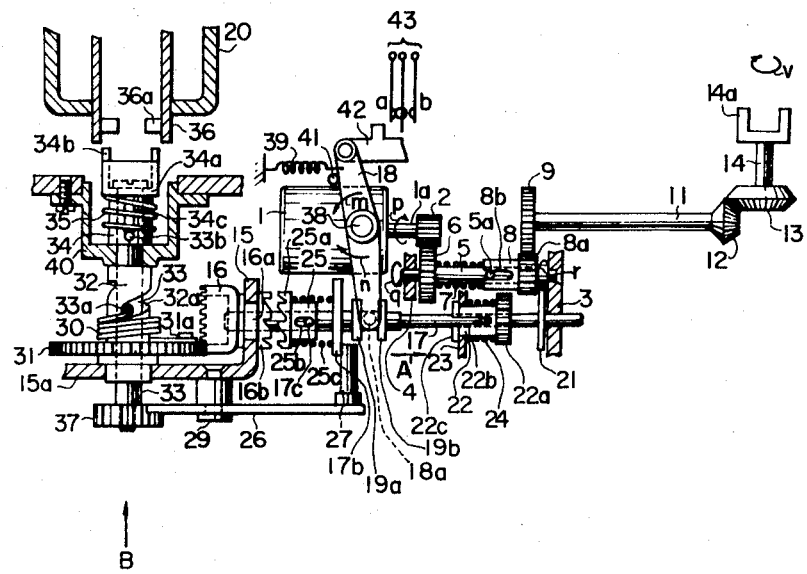
FIG. 1 is a partially sectioned side view showing essential parts of a motor driven mechanism embodying the present invention, the mechanism being shown in a film winding position.

Referring in detail to the embodiments shown in the drawings, the reference numeral 1 designates a motor having the casing thereof securely fixed to the camera body. The motor may be of the type driven by a battery or of the type driven by a spring accommodated within the casing. The main or output shaft 1a of the motor is rotatable in the direction indicated by arrow P and has mounted securely thereon a gear 2.

A shaft 5 is rotatably supported at both ends thereof on stationary portions 3, 4 of the camera body. The shaft 5 has securely mounted at one end thereof a gear 6 which meshes with the gear 2 and at the other end thereof a gear 8a which is fitted with a sleeve 8 engageable with a gear 9. A spring 7 is inserted between the gear 6 and the shaft sleeve 8. The shaft 5 is provided with a pin member 5a which is engaged by a longitudinal groove or slot 8b of the sleeve 8 for allowing the same to move axially rightward, as seen in the drawing, and at the same time for transmitting rotational movement thereto. The gear 6 is rotatable in the direction indicated by the arrow $q$ for transmitting the rotational movement of the motor to the gear 8a.

An operating shaft 17 is rotatably supported on stationary portions 3 and 15 of the camera body for rotational movement and sliding movement in the direction indicated by arrows A and A', respectively, within a crown gear 16 having a tooth portion 16b for transmitting rotation. The operating shaft 17 is provided securely thereon with a pin member 17c which is in engagement with an elongated slot 25b of a clutch 25 loosely fitted on the operating shaft 17 for free sliding movement therealong and also for transmitting the rotational movement thereto. The clutch 25 is provided with a tooth portion 25a facing the tooth portion 16b of the crown gear 16. Furthermore, the the operating shaft 17 is provided with a collar 17b which disengageably engages a pin member 27 of a stop lever 26 which will be described hereinafter, a pair of collars 19a and 19b opposingly disposed with a small space therebetween, and a collar 21 which slidingly engages with the gear 8, the operating shaft 17 being loosely fitted with a shaft sleeve 22 having a longitudinal slot 22b which is engaged by a pin member 17a securely planted on the operating shaft 17. The shaft sleeve 22 is rotatably and slidably engaged by a stationary portion 23 of the camera body and provided with a gear 22a which is engageable with the gear 8, a collar 22c slidingly engageable with the stationary portion 23, and a spring 24 interposed between the stationary portion 23 and the gear 22a, the spring 24 biasing the shaft sleeve 22 to move rightwardly, as seen in the drawing, along the operating shaft 17.

Interposed between the collars 19a and 19b mentioned hereinbefore is a pin member 18a provided at one end of an intermediate lever 18 which is rotatably supported on a shaft 38 mounted on a stationary portion (not shown) and biased to rotate counterclockwise as indicated by arrow m by the action of a spring 39, the intermediate lever 18 pivotally supporting an operating lever 42 at the other end thereof.

In the film winding position shown in FIG. 1, the intermediate lever 18 is rotated in the counterclockwise direction as indicated by arrow m by the action of the spring 39 and brought into abutting engagement with the stopper 41. The operating lever 17 is moved axially rightwardly, as seen in the drawing, breaking the transmission of the rotational movement from the operating shaft 17 to the crown gear 16, so that the collar 25 comes into engagement with the pin member 27 of the stop lever 26. Following the rightward movement of the collar 21, the gear 8a is meshed with the gear 9 by the action of the spring 7.

The gear 9 is securely mounted on the shaft 11 and is adapted to transmit rotational movement in the direction indicated by arrow v to a shaft clutch 14a of the shaft 14 governing the winding of the film (not shown) and shutter charging, by way of the bevel gears 12 and 13.

On the other hand, a film rewinding gear 31 in meshing engagement with the crown gear 16 is secured on a shaft sleeve 32 the axial position of which is fixedly restricted by stationary portions 40 and 15a of the camera, the sleeve 32 having on the outer periphery thereof a spiral groove 32a. Fitted into the shaft sleeve 32 is a film rewinding shaft 33 for sliding and rotating movement therein. The film rewinding shaft 33 has a ratchet gear 37 securely mounted at one end thereof. The other end of the rewinding shaft 33 is engaged by a shaft sleeve 34 having a clutch 34a with an axial projection 34b and a longitudinal slot 34c. Further, the film rewinding shaft 33 is provided with two radially projecting pin members 33a and 33b. The pin member 33a is engaged by the spiral grooved 32a mentioned hereinbefore, while the other pin member 33b is engaged with the longitudinal slot 34c. The shaft sleeve 32 has wound around the outer periphery thereof a connecting spring member 30 one end of which is secured to the pin member 33a while the other end is connected to a pin member 31a fixed to the rewinding gear 31.

The springs 7, 24, 25c, 35 are provided for resiliently supporting the gears 8a, 22a, clutch 25 and operating shaft sleeve 34 for assuring secure meshing thereof when the operating lever 42 is manually operated.

More particularly, the gear 8a follows the leftward movement of the operating shaft 17 together with the collar 21 formed integrally therewith, the collar 21 pushing the gear 8a of the shaft sleeve 8 leftwardly. Even if a tooth end of the gear 22a is confronted by a tooth end of the gear 8a, the gear 8a may be brought into completely meshing engagement with the gear 22a by the action of the spring 7 in the next stage initiated by the rotation of the motor 1. Similarly, the tooth portion 25a of the clutch 25 securely meshes with the tooth portion 16a of the crown gear 16 for efficiently transmitting the rotational movement. Furthermore, in the case where the inner claw 36a of the magazine meets with the clutch 34b of the shaft sleeve 34 without engagement therebetween when the film rewinding shaft 33 is moved toward the magazine, the spring 35 is compressed and the film rewinding shaft 33 is rotated to change the relative position of the inner claw 36a of the magazine and the clutch 34b of the operating shaft sleeve 34, with the result that the shaft sleeve 34 is moved upwardly rapidly by the force charged in the spring 35 to bring the inner claw 36a and the clutch 34b into secure engagement with each other.

A switch 43 is provided for switching an electric control circuit (not shown) of the motor 1 between the winding position and the rewinding position and adapted to close the winding circuit when connected to the terminal a as shown in FIG. 1. On the other hand, for the rewinding operation, the intermediate lever 18 is rotated in the direction indicated by an arrow to the position shown in FIG. 2. At the end of the rotary movement of the intermediate lever 18, the gear 8a disengaged from the gear 9 and meshes with gear 22a and the tooth portion 25a of the clutch 25 meshes with the tooth portion 16b which is coaxially provided with respect to the crown gear 16. Thereafter, the switch is connected to the terminal b to start the motor for rewinding.

As shown in FIGS. 3 and 4, a V-shaped stop lever is rotatably supported on a shaft 29 mounted on the stationary portion 15 of the camera body and is biased to rotate in the counterclockwise direction under the action of a spring member 28. The V-shaped stop lever is provided on one arm thereof with a pin member 27 which engages the collar 25 and on the other arm a hooked portion 26a which engages the ratchet gear 37 mentioned hereinbefore. The hooked portion 26a is held in a retracted position with respect to the ratchet gear 37 in the film winding condition shown in FIG. 1.

With the construction of the present invention described hereinabove, in the position shown in FIGS. 1 and 3, the operating shaft 17 is slided in the direction indicated by the arrow A' by the intermediate lever 18 which is rotated in the direction of the arrow m by the action of the spring 39, so that the motor 1 rotating in the direction of the arrow P imparts rotational movement in the direction of the arrow q to the shaft 5 via gears 2 and 6, further imparting rotational movement in the direction of the arrow r to the shaft sleeve 8 via pin member 5a and the longitudinal slot 8b, and rotational movement in the direction of the arrow $v$ to the clutch 14a via gears 8a, 9, shaft 11, bevel gears 12, 13 and shaft 14 for winding the film, while the film rewinding mechanism is left free.

Under these circumstances, if the operating lever 42 is shifted rightward, as seen in the drawings, the intermediate lever 18 is rotated clockwise as indicated by the arrow $n$ against the action of the spring member 39 to slide the operating shaft 17 in the direction of the arrow A by way of the pin member 18a, collars 19a and 19b. At this time, the collar 21 first pushes and moves the gear 8a in the direction of the arrow A to disengage the gear 8a from the gear 9 and causes the gear 8a and the gear 22a to slide in the direction of the arrow A against the action of the springs 7 and 24, respectively, to engage the gears 8a and 22a with each other while allowing the tooth portion 25a of the clutch 25 to engage with the tooth portion 16a in preparation for transmission of the rotational movement of the shaft sleeve 8 in the direction of the arrow $r$ to the operating shaft 17 for rotating the same in the direction of the arrow $s$. Therefore, it becomes possible to rotate the crown gear 16 in the direction of the arrow $t$. On the other hand, the collar 25 is retracted from the pin member 27 of the stop lever 26 by the displacement in the direction of the arrow A and the stop lever 26 is rotated counterclockwise under the action of the spring 28 as shown in broken lines in FIG. 4 with the hooked portion 26a thereof engaging the ratchet gear 37 for stopping the rotation thereof. Furthermore, by moving the operating lever 42 slightly rightward, the switch 43 is connected to $b$ and the motor 1 drives the gear 16 to rotate the same through the connections mentioned hereinbefore.

Figure 2:
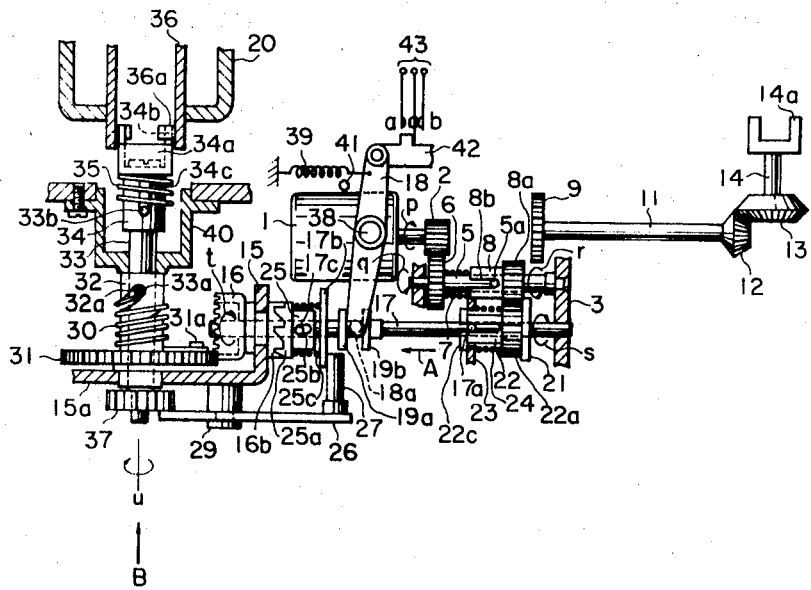
FIG. 2 is a view similar to FIG. 1 showing the mechanism in a film rewinding position.

While the rewinding gear 31 meshing with the crown gear 16 rotates together with the shaft sleeve 32 in the counterclockwise direction or the direction of the arrow $u$ as seen from the direction B in FIG. 2, the rotational movement of the film rewinding shaft 33 is stopped by the stop lever 26 as mentioned hereinbefore, so that there occurs a relative rotational movement between the film winding shaft 33 and the sleeve 32, causing the pin member 33a to move upwardly along the spiral groove 32a as indicated by the arrow B tensioning the connecting spring 30. At the end of the upward movement of the pin member, the ratchet gear 37 moving upwardly with the shaft 33 as indicated by the arrow B is disengaged from the hooked portion 26a of the stop lever 26, so that the stop lever 26 is rotated by the action of the spring 28 until the pin member 27 comes into engagement with the collar 25 into the position shown in solid lines in FIG. 4 and the rewinding shaft 33 is held in a position displaced with respect to the operation shaft sleeve 32 in the direction of the arrow B against the action of the connecting spring member 30.

When the film rewinding shaft 33 is moved upwardly or in the direction B, the projection 34b of the operating clutch 34a provided at the fore end of the rewinding shaft 33 comes into engagement with the inner claw 36a projecting inwardly from the inner surface of the spool shaft 36 of the magazine 20, disengaging from the hooked portion 26a of the stop lever as described hereinbefore. At the same time, the pin member 33a is brought into abutting engagement with the upper end surface of the spiral-shaped cam groove 32a, and the film rewinding shaft 33 which is rotated in the direction of the arrow $u$ together with the operating shaft sleeve 32 causes the shaft 36 of the magazine 20 to rotate in the same direction for rewinding the film.

After completion of the film rewinding operation, the operating lever 42 is returned to its initial position under the action of the spring 39. Following the rightward movement of the operating shaft 17, the gear 22a disengages from the gear 8a which then meshes with the gear 9. The tooth portion 25a of the clutch 25 is retracted from the tooth portion 16b for disengagement therefrom, and at the same time the pin member 27 of the stop lever 26 is pushed rightwardly by the rightward movement of the collar 17b to return the stop lever from the position of FIG. 4 to the position of FIG. 3 against the action of the spring 28. Therefore, the ratchet gear 37 and the crown gear 16 are left completely free, with the result that the operating shaft sleeve 34 is retracted from the shaft 36 of the magazine 20 by the contracting force charged in the connecting spring 30 to return to the film rewinding position as shown in FIG. 1.

FIGS. 5 and 6 show another embodiment of the present invention, wherein the switching between the film winding and film rewinding is effected by changing the direction of rotation of the motor 1, as compared to the first described embodiment wherein the switching is effected by switching gears. In the modification of FIGS. 5 and 6, like parts are designated by like numerals and characters. The motor 1 rotates in the direction of the arrow $p$ when the switch 43 is connected to the terminal $a$ for shutter charging and film winding. If the switch 43 is connected to the terminal $b$ the motor 1 is rotated in the direction reverse to the direction of the arrow $p$.

If the motor 1 is rotated in the direction of the arrow $p$, the gear 8a is rotated in the direction of the arrow $q$ and the rotation of the gear 9 is transmitted to the shaft 11 via friction roller 48 and the cam plate 11a to rotate the same for film winding and shutter charging. On the other hand, the rotation of the gear 8a in the direction of the arrow $q$ causes the gear 44 to rotate clockwise, as seen in FIG. 6, however, the friction gear 46 does not transmit the rotation of the gear 44 to the cam plate 45a, so that the shaft 45 and the cam plate 45a do not rotate.

If the operating lever 42 is moved rightward for rewinding operation, the switch 43 is connected to the terminal $b$ by the projection of the operating lever, causing the motor 1 to rotate in the reverse direction or in the direction reverse to the direction $p$. This causes the gear 8a to rotate in a direction reverse to the direction $q$ and the rotational movement of the gear 8a is transmitted through the gear 44, friction roller 46 and cam plate 45a to rotate the shaft 45, the gear 45b securely mounted on the shaft 45 and the gear 47a meshed with the gear 45b, and then transmitted through the pin member 47b and the strip 49a of the connecting member 49 to rotate the operating shaft 17 for carrying out the film rewinding operation in the same manner as in the first described embodiment. In this instance, by rotation of the gear 8a in the direction opposite to the direction of the arrow $q$, the gear 9 is rotated counterclockwise as seen in FIG. 6, however, the rotation of the gear 9 is not transmitted to the cam plate 11a by the friction roller 48, so that the rotation of the motor 1 in the direction reverse to the direction $p$ is not transmitted to the winding control mechanism.

It will be understood from the foregoing that, according to the present invention, the rotation of the motor is selectively transmitted to the film winding mechanism and the film rewinding mechanism. In order to transmit the rotation to the film rewinding side, the rotation of the film rewinding shaft is stopped for displacing the shaft axially to engage the clutch thereof with the spool shaft of the magazine on the film rewinding side. After engagement of the clutch with the magazine shaft, the film rewinding operating shaft is rotated for rewinding the film. It is therefore possible to engage the clutch of the film rewinding operating shaft securely with the magazine shaft and to effect the film rewinding operation in a secure manner with a simple construction.

It should be understood that the present invention is not limited to the particular construction described hereinbefore but is subject to various changes and modifications within the scope of the invention as defined in the appended claims.

What is claimed is:

1. A film rewinding mechanism for a motor driven photographic camera, comprising:
    a motor;
    an operating shaft rotatably supported on stationary members of the camera and axially movable between a first position for winding a film and second position for rewinding the film;
    an operating member for positioning said operating shaft in said first or second position;
    a means for transmitting rotational movement of the motor to said operating shaft when the operating shaft is in said second position;
    a shaft sleeve held in an axially fixed position by stationary members of the camera and adapted to transmit the rotational movement of said operating shaft;
    a rewinding shaft slidably movable with respect to said shaft sleeve and having a first stop member securely mounted thereon and a clutch means;
    a connecting spring member for connecting said shaft sleeve with said rewinding shaft;
    a driving means for driving said rewinding shaft toward a shaft of a film magazine against action of said connecting spring member by relative rotational movement between said rewinding shaft which is held in a stop position and said shaft sleeve which is maintained in rotation; and
    a second stop member adapted to be disengaged from said first stop member when said operating shaft is in said first position and to be engaged with said first stop member when the operating shaft is in said second position for stopping the rotational movement of said rewinding shaft until the rewinding shaft is axially displaced by a predetermined distance with respect to said shaft sleeve to bring said clutch means of said rewinding shaft into engagement with a shaft of a film magazine.

2. A film rewinding mechanism for a motor driven photographic camera as set forth in claim 1, wherein the shaft sleeve held in an axially fixed position by stationary members of the camera has formed on the outer periphery thereof with a spiral groove, and said film rewinding shaft is provided on the side surface thereof with a pin member which is slidably engaged by said spiral groove of said shaft sleeve.

3. A film rewinding mechanism for a motor driven photographic camera as set forth in claim 1, wherein said film rewinding shaft has provided at one end thereof with a clutch means engageable with the shaft of the film magazine and at the other end with a ratchet gear, further including a stop lever having provided on one arm thereof with a hooked portion and on the other arm thereof with a member engaged by a locking member provided on the operating shaft, said hooked portion of the stop lever being biased toward the center of said ratchet gear by means of a spring, said locking member releasing the stop lever from a locked position thereof when said operating lever is shifted from the first position to the second position, thereby allowing the hooked portion of the stop lever to engage with the ratchet gear, the hooked portion of the stop lever being disengaged from the ratchet gear when the film rewinding shaft is axially displaced with respect to the shaft sleeve and the clutch means of the rewinding shaft is engaged by the film magazine shaft, the stop lever holding said rewinding shaft in an axially locked position through said ratchet gear.

4. A film rewinding mechanism for a motor driven photographic camera as set forth in claim 1, further including a gear means disengageably meshing with a gear connected to an output shaft of the motor, said gear means being securely mounted on a sleeve slidably fitted over the operating shaft and having a longitudinal slot for receiving thereinto a pin member projecting radially from said operating shaft, said sleeve being slidably and rotatably fitted in an aperture formed in a stationary portion of the camera body and having a spring resting on one face of said stationary portion and a collar slidably engaged with the other face of said stationary portion.

5. A film rewinding mechanism for a motor driven photographic camera as set forth in claim 1, wherein said clutch means is slidably fitted over said rewinding shaft for movement therealong and having a longitudinal slot extending parallel to the axis of said rewinding shaft and engaged by a pin member radially projecting from said rewinding shaft, said clutch means being provided at the upper end thereof with an axial projection engageable with a pin member projecting inwardly from the inner surface of the film magazine shaft, further including a spring member inserted between the clutch means and the rewinding shaft.

6. A film rewinding mechanism for a motor driven photographic camera, comprising:
    a motor;
    an operating member movable between a first position for winding a film and a second position for rewinding the film;
    a shaft sleeve held in an axially fixed position by stationary members of the camera;
    means for transmitting rotational movement of the motor to said shaft sleeve when said operating member is in said second position;
    a rewinding shaft sliding movable with respect to said shaft sleeve and having a first stop member securely mounted thereon and a clutch means;
    a connecting spring member for connecting said shaft sleeve with said rewinding shaft;
    a driving means for driving said rewinding shaft toward a shaft of a film magazine against action of said connecting spring member by relative rotational movement between said rewinding shaft which is held in a stop position and said shaft sleeve which is maintained in rotation; and a second stop member adapted to be disengaged from said first stop member when said operating member is in said first position and to be engaged with said first stop member when said operating member is in said second position for stopping the rotational movement of said rewinding shaft until the rewinding shaft is axially displaced by a predetermined distance with respect to said shaft sleeve to bring said clutch means of said rewinding shaft into engagement with a shaft of a film magazine.

* * * * *